United States Patent Office 3,314,923
Patented Apr. 18, 1967

3,314,923
PROCESS FOR PREPARING IMIDE CONTAINING POLYISOCYANATES
Gerhard Muller, Leverkusen, and Rudolf Merten, Cologne-Flittard, Germany, assignors to Farbenfabriken Bayer Aktiengesellschaft, Leverkusen, Germany, a corporation of Germany
No Drawing. Filed Nov. 26, 1963, Ser. No. 326,255
16 Claims. (Cl. 260—78)

This invention relates to isocyanate compositions and more particularly to a novel process for high molecular weight polyisocyanates.

It is known to prepare polyisocyanates by a number of ways, for example, high molecular weight polyisocyanates may be obtained by the phosgenation of amines. Also polyisocyanates may be prepared by treating compounds containing several active hydrogen atoms with an excess of polyisocyanate monomers. An addition reaction, with migration of the reactive hydrogen atoms, takes place and the addition product has a higher molecular weight, and may have more —NCO groups per molecule than the polyisocyanate monomer put into the reaction. The use of compounds with only one reactive hydrogen atom leads to a reduction in the functionality and is, therefore, of no technical interest.

It is, therefore, an object of this invention to provide a novel process for the preparation of polyisocyanates. Another object of this invention is to provide a method for the preparation of polyisocyanates containing imide groups. Another object of this invention is to provide a method for the preparation of masked isocyanates. Still a further object of this invention is to provide a comparatively simple method for the preparation of polyisocyanates which will require little, if any, modification in the production system. Still a further object of this invention is to provide a process for the preparation of polyisocyanates which does not always require the phosgenation of compositions containing active hydrogen atoms.

The foregoing objects and others which will become apparent from the following description are accomplished in accordance with this invention, generally speaking, by providing a process for the preparation of polyisocyanates containing imide groups which involves reacting monomeric polyisocyanates with compositions containing at least one cyclic carboxylic acid anhydride group, said polyisocyanate being used in the reaction is a stoichiometric excess over the corresponding functional group of said anhydride.

It has now been found that compounds which contain one or more cyclic carboxylic acid anhydride groups instead of one or more transferable hydrogen atoms are also suitable for condensation with monomeric polyvalent isocyanates. The anhydride structure reacts with one equivalent of isocyanate, $CO_2$ is split off and a cyclic imide is formed as represented by the following equation scheme showing how an isocyanate group reacts with a cyclic anhydride configuration. This mode of reaction is employed in the present invention for polyfunctional starting materials.

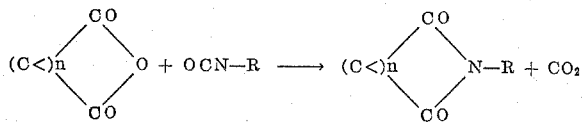

wherein R is a radical selected from the group consisting of aliphatic, aromatic, cycloaliphatic, araliphatic, and mixtures thereof, and $n$ is an integer of from 2 to 3.

The process according to the invention, therefore, concerns the preparation of high molecular weight polyisocyanates which contain imide groups and which may be masked. The process is characterized in that monomeric polyisocyanates are reacted with compounds which contain one or more cyclic anhydride groups, and which, where only one anhydride group is present, must contain also at least one hydrogen atom capable of reacting with —NCO groups; the high molecular weight polyisocyanates so obtained may, if desired, subsequently be masked in a manner known per se.

The following are examples of polyisocyanates: aliphatic diisocyanates such as butane-, hexane- and heptane diisocyanate, aliphatic diisocyanates with a built in ring system such as $\omega,\omega'$-diisocyanate-1,3-dimethylbenzene, $\omega,\omega'$-diisocyanate-1,4-dimethylcyclohexane, $\omega,\omega'$-diisocyanate-1,4-diethylbenzene and cyclohexane-1,3-, cyclohexene-1,4-, 1-methylcyclohexane-2,4- and dicyclohexylethane-4,4'-diisocyanates. In addition, there may be mentioned mixed aromatic aliphatic and aromatic hydroaromatic diisocyanates such as 4-phenylisocyanate-methylisocyanate, tetrahydronaphthylene-1,5-, hexahydrobenzidine-4,4'- and hexahydrodiphenylmethane-4,4'-diisocyanates, also diisocyanates of benezene and its homologues, for example, 1,3-phenylene-, 1,4-phenylene-, 1-methylenebenzene-2,4- and 1-methylbenzene-2,6-diisocyanate and mixtures of their isomers, mono-, di- and triisopropylbenzyl-diisocyanates, polyisocyanates of naphthalene of diphenyls and of di- and tri-phenylmethane with polynuclear ring systems or of polyphenyl compounds. Examples of the last mentioned classes of substances are naphthalene-1,4-, naphthalene-1,5-, diphenyl-4,4'-, diphenylmethane-4,4'-, anthraquinone-2,6- and diphenylsulphide-2,4-diisocyanates, triphenylmethane-4,4',4''-triisocyanate, 4,4'-dimethyldiphenylmethane-2,2'-, 5,5'-tetraisocyanate, triphenyl phosphate 4,4',4''-triisocyanate and polyphenylmethylpolyisocyanates as obtained by aniline/formaldehyde condensation followed by phosgenating. The polyisocyanates used according to the invention may also be substituted by halogen-, alkoxy-, azo-, nitro-, cyano-, ester- or sulphonic groups. Examples of these are 1-chlorobenzene-, 1-nitrobenzene- and 1-methoxybenzene-2,4-diisocyanate, tetrachloro-p-phenylene diisocyanate, azobenzene-4,4'-diisocyanate and benzidine sulphonic-4,4'-diisocyanate.

Compounds with several functional groups are used for reaction with the polyisocyanates and at least one of these groups must be a cyclic anhydride group, i.e. these compounds contain either two or more cyclic anhydride groups or at least one cyclic anhydride group and additional reactive hydrogen atoms; these additional reactive hydrogen atoms being, for example, in hydroxy, mercapto, carboxyl or amino groups. Additional reactive hydrogen atoms may, of course, be present when there are several anhydride groups in the molecule. Compounds of this kind may be derived, for example, from pyromellitic acid, trimellitic acid, mellitic acid, naphthalene-1,4,5,8-naphthalene-2,3,6,7- or naphthalene-1,2,5,6-tetracarboxylic acid, diphenyl-3,3',4,4'- and diphenyl-2,2',3,3'-tetracarboxylic acid, 2,2-di-(3,4-dicarboxyphenyl)-propane, di-(3,4-dicarboxyphenyl)-sulphone, perylene-3,4,9,10-tetracarboxylic acid and ethylene tetracarboxylic acid. In addition, there may be mentioned the internal anhydrides of hydroxy-, mercapto- or amino-o-phthalic acid or of hydroxy-, mercapto-, or amino-naphthalinic-dicarboxylic acid whose carboxyl groups are in the o-position one to another. Suitable for the process according to the invention are also di-adducts of maleic acid or maleic anhydride with styrene or substituted styrene as well as phenylene-di-[alkane-di-(carboxylic acid anhydride)] as described in Belgian patent specification No. 613,374 and dicyclo-tetracarboxylic acid dianhydrides as described in U.S. Patent No. 3,037,966 as well as polyanhydrides obained by chlorinating paraffins, for example, in the presence of maleic anhydride.

To carry out the process, the components are placed together, as far as possible under anhydrous conditions, preferably in solvents which are inert under the reaction conditions. Suitable solvents are halogenated hydrocarbons, phenols, esters, ketones, ethers, substituted amides, sulphoxides and sulphones such as xylene, phenol, cresol, acetophenone, mono- and dichlorobenzene, ethylene glycol monomethyl ether acetate, N-methylpyrrolidone, dimethylformamide, dimethylacetamide, dimethylsulphoxide and dimethylsulphone and mixtures thereof. Phenols behave as inert solvents under the reaction conditions.

The proportion of anhydride to polyisocyanate may be varied widely, provided that an excess of the polyisocyanate is added. In general, at least 1.1 equivalents, preferably 1.1 to 3 equivalents of —NCO will be used per functional group.

The reaction is carried out at temperatures of about 50° C. to about 200° C., preferably about 100° C. to 170° C., and is complete after one hour. The reaction components may be added in any sequence; for example, polyisocyanate, if desired, in solution may be put into the reaction vessel and the anhydride may be added as second reaction component or conversely.

The isocyanate groups of the resulting high molecular weight polyisocyanates which contain imide groups may be masked in known manner by reaction with compounds which can be split off again, for example, phenols, substituted phenols or compounds containing active methylene groups.

Polyisocyanates with any desired isocyanate content, i.e. of any desired degree of condensation may be produced depending upon the ratio of the starting components, the duration of the reaction and the reaction temperature. The high molecular weight polyisocyanates obtained by the process described above may be isolated in known manner as free isocyanates in pure form or in solution, for example, by crystallization, precipitation or sublimation.

The products of the process may be used as adhesives or as auxiliary agents for rubber. Thus, for instance, the product of Example 8 (with free NCO groups instead of the blocked ones) can be dissolved in a solvent of equal parts of dimethyl formamide and N-methylpyrrolidone. With this solution steel plates can be sprayed and rubber sheets pressed onto the prefabricated plates which results in a strong bond between steel and rubber.

The following examples will further illustrate the process of the present invention and will describe various preferred embodiments of the present invention. Parts and percentages are by weight unless otherwise specified.

EXAMPLE 1

A solution of about 110 parts by weight of diphenylmethane-4,4′-diisocyanate and about 52.5 parts of hexamethylene-1,6-diisocyanate in about 250 parts of N-methylpyrrolidone is added dropwise to a solution of about 96 parts of trimellitic acid anhydride in about 250 parts of N-methylpyrrolidone at about 50° C. to 60° C. The mixture is heated for about 4 hours at about 120° C. in an atmosphere of nitrogen while stirring. The isocyanate content of the solution is then 1.35%. The polyisocyanate obtained is masked by reaction with about 25 parts of crude cresol. About 718 parts of a solution of the masked polyisocyanate in N-methylpyrrolidone are obtained (viscosity 2070 cp./25°, solids content 33%). The masked polyisocyanate has absorption bands at 1710 and 1768 cm.$^{-1}$ in the IR spectrum, indicating an imide structure.

EXAMPLE 2

A mixture of about 65 parts of toluylene-2,4-diisocyanate and about 63 parts of hexamethylene-1,6-diisocyanate is added dropwise at about 40° C. over 10 to 15 minutes, to a solution of about 96 parts of trimellitic acid anhydride in about 500 parts of N-methylpyrrolidone. After heating the reaction mixture at about 120° C. for about 6½ hours, the isocyanate content is 1.5%. The polyisocyanate obtained is masked by reaction with about 30 parts of crude cresol. About 705 parts of a solution of the masked polyisocyanate in N-methylpyrrolidone are obtained (viscosity 144 cp./25°, solids content 34%). The masked polyisocyanate has absorption bands at 1710 and 1768 cm.$^{-1}$ in the IR spectrum, which correspond to imide groups.

EXAMPLE 3

A solution of about 281 parts of diphenylmethane-4,4′-diisocyanate and about 195 parts of toluylene-2,4- and 2,6-diisocyanate in about 750 parts of N-methylpyrrolidone is added dropwise at about 50 to 60° C. to a solution of about 288 parts of trimellitic acid anhydride in about 750 parts of N-methylpyrrolidone. The reaction mixture is heated for about 1½ hours at about 120° C. The isocyanate content of the solution is then 1.44%. The polyisocyanate formed is masked by reaction with about 90 parts of crude cresol. About 2205 parts of a solution of the masked polyisocyanate in N-methylpyrrolidone are obtained (viscosity 425 cp./25°, solids content 33%). The imide structure of the polyisocyanate is demonstrated in the IR spectrum as in Examples 1 and 2.

EXAMPLE 4

A solution of about 16.8 parts of hexamethylene-1,6-diisocyanate in about 30 parts of N-methylpyrrolidone is added dropwise at about 25° C. to a solution of about 9.6 parts of trimellitic acid anhydride in about 40 parts of N-methylpyrrolidone. The reaction mixture is heated for about 2 hours at about 100° C. The solution of the polyisocyanate thus formed has an isocyanate content of 5.6%. The imide absorption bands may be observed in the IR spectrum.

EXAMPLE 5

A solution of about 25 parts of diphenylmethane-4,4′-diisocyanate in about 100 parts of dimethylformamide is added dropwise at about 25° C. to a solution of about 10.9 parts of pyromellitic acid anhydride in about 100 parts of dimethylsulphoxide. The reaction mixture is heated for about 20 minutes at about 100° C. and the solution of the polyisocyanate then has an isocyanate content of 0.73%. The IR spectrum has absorption bands at 1710 and 1770 cm.$^{-1}$ which correspond to imide groups.

EXAMPLE 6

A solution of about 38.4 parts of hexahydrodiphenyl methane-4,4′-diisocyanate in about 70 parts of dimethyl formamide is added dropwise at about 50 to 60° C. to a solution of about 19.2 parts of trimellitic acid anhydride in about 70 parts of N-methylpyrrolidone. The reaction product is heated for about 3 hours at about 100° C. The isocyanate content of the solution is then 3.15%. The bands due to the imide structure of the polyisocyanate formed may be detected in the IR spectrum.

EXAMPLE 7

A solution of about 18.3 parts of 2,4-diisopropylbenzene-1,5-diisocyanate and about 12.6 parts of hexamethylene-1,6-diisocyanate in about 50 parts of N-methylpyrrolidone is added dropwise at about 50 to 60° C. to a solution of about 19.2 parts of trimellitic acid anhydride in about 50 parts of N-methylpyrrolidone. The mixture is heated for about 5 hours at about 100° C. The solution of the polyisocyanate produced has an isocyanate content of 4.96%. The bands due to the imide groups in the polyisocyanate may be detected in the IR spectrum.

EXAMPLE 8

About 50 parts of 4,4′-diisocyanate-diphenyl-methane are heated to about 160° C. in about 250 parts of commercial dichlorobenzene and about 19.2 parts of trimellitic acid anhydride are introduced over about 30 minutes. Carbon dioxide is evolved. After about 2 hours, about 22 parts of commercial cresol are added at about 160° C. The solution, which is at first clear becomes turbid after some time.

It is maintained at about 160° C. for about 3 hours and is then allowed to cool slowly, a resinous mas precipitates. By decanting the dichlorobenzene and triturating the residue with petroleum ether, a 95% yield of a yellow powder, softening about 130° C. to 135° C. is obtained which has an IR spectrum consistent wtih the supposed structure of a masked imide-amide diisocyanate of the formula

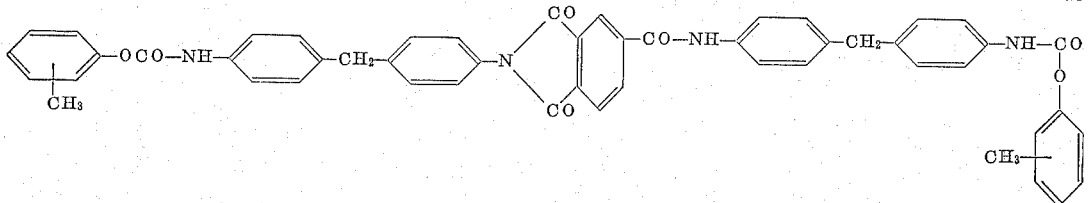

EXAMPLE 9

About 19.2 parts of trimellitic acid anhydride are slowly added at about 160° C. to a solution of about 50 parts of 4,4'-diisocyanate-diphenylmethane in about 40 parts of ethylene glycol monomethyl ether acetate, about 19.2 parts of phenol are added after about 1 hour. The mixture is kept at about 160° C. for about 4 hours, whereby a yellow product is precipitated. After cooling, the solvent may be removed by suction filtration at about 50° and 12 mm. Hg. Masked polyisocyanate showing evidence in the infra-red spectrum of imide groups is obtained in quantitative yield. Softening point about 180 to 185°.

EXAMPLE 10

About 100 parts of commercial cresol, about 50 parts of diphenylmethane-4,4'-diisocyanate and about 19.2 parts of trimellitic acid anhydride are reacted together in three separate experiments. In each of these experiments, two of the three components are mixed together at about 160° C. and the third component is then added. Cresol solutions of the imidopolyisocyanate in the form of a product from which cresol can be split off are obtained after about 3 hours at about 160° C. The three solutions have identical IR spectra.

It is to be understood that this invention is not limited by the examples, but that any of the compositions mentioned above as typical for use in the present invention may be used in place of those set forth in the examples with similar results.

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:

1. A process for the preparation of polyisocyanates containing imide groups which comprises condensing a carbocyclic aromatic compound having functional groups selected from the class consisting of hydroxyl, mercapto, amino, carboxylic acid and cyclic carboxylic acid anhydrides, said compound containing at least one cyclic carboxylic acid anhydride group with a monomeric polyisocyanate at a temperature of at least about 50° C., said polyisocyanate being used in a stoichiometric excess over the functional groups in said compound.

2. The process of claim 1 wherein the carbocyclic aromatic compound is condensed with a monomeric polyisocyanate under substantially anhydrous conditions.

3. The process of claim 2 wherein the imide containing polyisocyanates are reacted with a compound selected from the group consisting of phenols and cresols.

4. A process for the preparation of polyisocyanates containing imide groups which comprises condensing a mixture comprising diphenyl methane-4,4'-diisocyanate, and 2,4- and 2,6-tolylene diisocyanate with trimellitic acid anhydride in the presence of N-methylpyrrolidone at a temperature of about 120° C.

5. The process of claim 4 wherein the imide containing polyisocyanates are reacted with cresol.

6. A process for the preparation of polyisocyanates containing imide groups which comprises condensing diphenylmethane-4,4'-diisocyanate with trimellitic acid anhydride at a temperature of about 160° C. in the presence of ethylene glycol monomethyl ether acetate.

7. The process of claim 6 wherein the imide containing polyisocyanates are reacted with phenol at a temperature of about 160° C.

8. The process of claim 1 wherein the compound contains a cyclic carboxylic acid anhydride and at least one hydrogen atom capable of reacting with the NCO groups.

9. A process for the preparation of polyisocyanates containing imide groups which comprises condensing diphenylmethane-4,4'-diisocyanate with pyromellitic acid anhydride at a temperature of about 100° C. to form an imide containing polyisocyanate.

10. The process of claim 1 wherein a mixture of polyisocyanates is reacted with a compound containing at least one cyclic carboxylic acid anhydride group.

11. The process of claim 1 conducted under substantially anhydrous conditions.

12. The process of claim 1 wherein at least one of the reaction components is in an inert solvent.

13. The process of claim 1 whereby said reaction is carried out at a temperature of about 50° C. to about 200° C.

14. The process of claim 1 wherein said reaction is carried out at a temperature of about 100° C. to about 170° C.

15. The process of claim 1 wherein said compound contains at least one cyclic carboxylic acid anhydride group also contains an active hydrogen containing group as determined by the Zerewitinoff method.

16. The process of claim 1 wherein said polyisocyanate and said anhydride are reacted in an amount whereby from about 1.1 to about 3 equivalents of —NCO groups are present for each equivalent of the functional group in said anhydride.

References Cited by the Examiner

UNITED STATES PATENTS

| 2,268,586 | 1/1942 | Gilman | 260—78 |
| 2,621,168 | 12/1952 | Ross et al. | 260—78 |
| 2,723,265 | 11/1955 | Stallmann | 260—77.5 |

OTHER REFERENCES

Otvos et al.: "Tetrahedron Letters," 1960, No. 2, pp. 15–18.

Staiger et al.: "Journal of Chemical and Engineering Data," vol. 8, July 1963, pp. 454–456.

Wagner et al.: "Synthetic Organic Chemistry," John Wiley & Sons, Inc., New York, 1953, pp. 568, 645, 675–676, and 678.

WILLIAM H. SHORT, *Primary Examiner.*

NICHOLAS S. RIZZO, *Examiner.*

H. D. ANDERSON, MARY U. O'BRIEN,
*Assistant Examiners.*